(12) United States Patent
Oshima

(10) Patent No.: US 8,582,184 B2
(45) Date of Patent: Nov. 12, 2013

(54) IMAGE READER AND DOCUMENT CONVEYING METHOD

(75) Inventor: Osamu Oshima, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 13/394,884

(22) PCT Filed: Sep. 7, 2010

(86) PCT No.: PCT/JP2010/065295
§ 371 (c)(1),
(2), (4) Date: Mar. 8, 2012

(87) PCT Pub. No.: WO2011/033963
PCT Pub. Date: Mar. 24, 2011

(65) Prior Publication Data
US 2012/0170086 A1    Jul. 5, 2012

(30) Foreign Application Priority Data
Sep. 18, 2009  (JP) ................. 2009-218065

(51) Int. Cl.
*H04N 1/00* (2006.01)
*H04N 1/04* (2006.01)
*G06F 3/12* (2006.01)
*G03G 21/00* (2006.01)

(52) U.S. Cl.
USPC ........... 358/474; 358/408; 358/498; 358/496; 358/1.15; 399/364; 399/374; 399/371; 355/23; 355/24; 271/3.19

(58) Field of Classification Search
USPC ................. 358/408, 498, 496; 399/364, 374; 355/23, 24
See application file for complete search history.

(56) References Cited

U.S. PATENT DOCUMENTS 5,278,622 A * 1/1994 Segawa .................. 399/371
5,313,258 A * 5/1994 Nishi ..................... 399/402
(Continued)

FOREIGN PATENT DOCUMENTS

| JP | 5-336305 A | 12/1993 |
| JP | 11-215297 A | 8/1999 |
| JP | 2003-158605 A | 5/2003 |
| JP | 2009-10861 A | 1/2009 |

OTHER PUBLICATIONS

Official Communication issued in International Patent Application No. PCT/JP2010/065295, mailed on Oct. 12, 2010.

*Primary Examiner* — Akwasi M Sarpong
(74) *Attorney, Agent, or Firm* — Keating & Bennett, LLP

(57) ABSTRACT

An image reader and document conveying method shorten times necessary for a discharge process that discharges a document in being conveyed and for an idle feeding process of a document that is left on a paper feed tray.

If during double-sided reading, a stop key is operated to issue an instruction to cancel reading, a conveyance controller outputs a path specifying signal to select a single-sided path, and thereby a conveyance route is switched from a double-sided path to the single-sided path. For this reason, the discharge process that discharges a document being conveyed at the time of the reading cancellation to a paper discharge tray, and the idle feeding process that discharges a document left on a paper feed tray to the paper discharge tray are performed with use of the single-sided path that is shorter than the double-sided path, and therefore the times necessary for the discharge and idle feeding processes can be shortened.

15 Claims, 10 Drawing Sheets

(56) References Cited

U.S. PATENT DOCUMENTS

| | | | |
|---|---|---|---|
| 5,907,759 A * | 5/1999 | Yashiro | 399/371 |
| 6,032,941 A * | 3/2000 | Endo | 271/3.19 |
| 6,563,598 B1 * | 5/2003 | Johnson et al. | 358/1.15 |
| 7,468,818 B2 * | 12/2008 | Suzuki | 358/498 |
| 2009/0102908 A1 * | 4/2009 | Imoto | 347/104 |

* cited by examiner

CONTINUOUS READING BASED ON A SEQUENTIAL SYSTEM

CONTINUOUS READING BASED ON A BATCH SYSTEM

IMAGE READER AND DOCUMENT CONVEYING METHOD

BACKGROUND OF THE INVENTION

1. Field of the Invention

The present invention relates to an image reader and a document conveying method, and more particularly, to an improvement of an image reader that can, during continuous reading of two or more documents, cancel the reading.

2. Description of the Related Art

An image reader that can automatically convey two or more documents to sequentially read the documents is known. Further, an image reader that can perform double-sided reading of a document through automatic conveyance is also widely known. As an image reader that can perform the double-sided reading, one based on a one-pass two-scanner method that uses two image sensors to perform the double-sided reading of a document, or one based on a two-pass one-scanner method that reverses a document during automatic conveyance, and uses one image sensor to perform the double-sided reading of the document are known.

To perform the double-sided reading based on the two-pass one-scanner method, a switchback system that performs switchback that switches a conveying direction during conveyance of a document, and thereby passes the document twice in the same direction with respect to an image sensor, or a U-turn system that uses a U-turn path to make a conveyance path intersect with itself, and passes a document twice in opposite directions with respect to an image sensor are possible. In the case of using the U-turn system, it is not necessary to switch a conveying direction, so that conveyance control can be simplified, and also a reading time can be shortened (e.g., JPA-2009-10861).

In an image reader that performs such automatic conveyance, typically, during continuous reading of two or more documents, the reading process can be cancelled. For example, in the case where after a start key has been operated, a setting error of the image reader or a mix-up of documents is discovered, a user can operate a stop key to thereby cancel document reading that is being performed. In the case where such a cancel instruction is inputted, without performing the document reading, a discharge process that discharges to a paper discharge tray a document being conveyed is performed. By performing such a discharge process, even in the case of canceling a reading process, the user is not required to take the document out of a conveyance path.

Further, there is also an image reader that, in the case where the cancel instruction is inputted, performs an idle feeding process that sequentially discharges documents left on a paper feed tray to a paper discharge tray. By performing such an idle feeding process, even in the case of canceling a reading process, all documents can be brought into a state of being discharged to the paper discharge tray in the same order as that before reading. For this reason, after canceling the reading, it is not necessary for a user to overlap the documents on the paper feed tray and those on the paper discharge tray while checking the orders of the documents.

In the image reader based on the two-pass one-scanner method, the switchback or U-turn of a document is performed at the time of double-sided reading, so that as compared with single-sided reading, a conveyance length of the document is increased, and a document interval is also increased. For this reason, there occurs a problem that, in the case of canceling the double-sided reading, times necessary for subsequent discharge and idle feeding processes are increased as compared with the case of canceling the single-sided reading.

For example, the image reader based on the U-turn system is typically configured to branch a conveyance path into a single-sided path and a double-sided path, and uses the U-turn path to make only the double-sided path intersect with itself. Accordingly, the double-sided path is longer than the single-sided path, and further at the time of double-sided reading, it is necessary to make a document interval longer than that for the single-sided reading so as to prevent documents from colliding with each other. For this reason, there occurs a problem that, in the case of canceling the double-sided reading, the times necessary for the discharge and idle feeding processes are increased as compared with the case of canceling the single-sided reading.

SUMMARY OF THE INVENTION

In view of the above, preferred embodiments of the present invention provide an image reader that can, in the case of canceling document reading, shorten a time necessary for a discharge process that discharges a document being conveyed. Also, preferred embodiments of the present invention provide an image reader that can, in the case of canceling document reading, shorten a time necessary for an idle feeding process of a document left on a paper feed tray.

An image reader according to a first preferred embodiment of the present invention includes a reading specifying device arranged to specify either of double-sided reading and single-sided reading as a document reading method; a document feeder arranged to feed a document from a paper feed tray; a route switching device arranged to, at a branch point between a first conveyance path for the double-sided reading and a second conveyance path for the single-sided reading, on a basis of the specified reading method, switch a document conveyance route; and a cancel input device arranged to input a cancel instruction for the double-sided reading, and configured such that the route switching device selects the second conveyance path on a basis of the cancel instruction; the first conveyance path is longer than the second conveyance path; and a document that is left on the paper feed tray when the cancel instruction is inputted is fed after the input of the cancel instruction, and discharged through the second conveyance path.

According to such a configuration, if the cancel instruction is inputted during the double-sided reading of a document, the document conveyance route is switched from the first conveyance path to the second conveyance path by the route switching device. For this reason, an idle feeding process that conveys a document left after the input of the cancel instruction to a paper discharge tray is performed through the second conveyance path that is shorter than the first conveyance path, and therefore a time necessary for the idle feeding process can be shortened.

Note that the cancel instruction for the double-sided reading is only required to be external input to the image reader, and may be an operation input by a user or signal input from a user terminal. Also, the cancel instruction for the double-sided reading is not limited to a cancel instruction exclusive for the double-sided reading, but may be a cancel instruction that is inputted during the double-sided reading.

An image reader according to a second preferred embodiment of the present invention is, in addition to the above configuration, configured such that the first conveyance path includes an introduction path that conveys a document from the branch point to a reading position, and a U-turn path that makes the document having entered from the introduction path and passed through the reading position perform a U-turn and again enter the reading position; the second conveyance path joins the first conveyance path at a junction point in the U-turn path without passing through the reading position; and if two or more documents are left on the paper feed tray when the cancel instruction is inputted, the document feeding device feeds the documents at document intervals that are narrower than a document interval for the double-sided reading before the input of the cancel instruction.

According to such a configuration, the idle feeding process that conveys a document left after the input of the cancel instruction to the paper discharge tray is performed not through the first conveyance path that was used before the cancellation but through the second conveyance path that does not intersect with itself at the reading position. For this reason, documents can be fed at the narrower intervals than those for the case of the first conveyance path, and therefore the time necessary for the idle feeding process can be shortened. In particular, as the number of documents left on the paper feed tray increases, a larger effect can be obtained.

An image reader according to a third preferred embodiment of the present invention is, in addition to the above configuration, provided with a paper feed path that conveys a document from the paper feed tray to the branch point, and configured such that a document that is being conveyed through the paper feed path when the cancel instruction is inputted is discharged through the second conveyance path.

According to such a configuration, a document that is, at the time of the input of the cancel instruction, being conveyed through the paper feed path that is on an upstream side of the branch point can be conveyed to the second conveyance path. For this reason, the document can be discharged faster. Further, the subsequent idle feeding process can also be started early.

An image reader according to a fourth preferred embodiment of the present invention is, in addition to the above configuration, configured such that the document feeding device once cancels document feeding after the input of the cancel instruction and then restarts the document feeding such that a fore end of a document that is fed first after the input of the cancel instruction arrives at the junction point after a rear end of a document that was fed last before the input of the cancel instruction has passed through the junction point.

According to such a configuration, the documents fed before and after the input of the cancel instruction can be prevented from being brought into contact with each other at the junction point between the first conveyance path and the second conveyance path. In the case where the cancel instruction for the double-sided reading is inputted, if the route switching device immediately switches from the first conveyance path to the second conveyance path, and the document feeding device starts next document feeding, documents may be brought into contact with each other near the junction point between the first conveyance path and the second conveyance path. For this reason, by once canceling document feeding after the input of the cancel instruction and then restarting the document feeding, contact of the documents with each other can be prevented, An image reader according to a fifth preferred embodiment of the present invention is, in addition to the above configuration, provided with a document placement detector arranged to detect a document on the paper feed tray, and configured such that all documents that are left on the paper feed tray when the cancel instruction is inputted are discharged through the second conveyance path.

According to such a configuration, in the case of canceling a reading process, all documents can be discharged in the same order as that before reading. For this reason, after canceling the reading, it is not necessary for a user to overlap the documents on the paper feed tray and discharged documents while checking the orders of the documents.

An image reader according to a sixth preferred embodiment of the present invention is, in addition to the above configuration, provided with a document contact determination device adapted to, if the route switching device selects the second conveyance path on a basis of the cancel instruction, determines whether or not contact of documents with each other occurs, and configured such that the route switching device selects the second conveyance path on a basis of a result of a determination by the document contact determination device after a document that was fed last before the input of the cancel instruction has arrived at the branch point; and the document feeding device once cancels the document feeding on a basis of the result of the determination by the document contact determination device after the input of the cancel instruction, and then restarts the document feeding.

According to such a configuration, in the case where if the document that was fed before the input of the cancel instruction is guided to the second conveyance path, the document may be brought into contact with another document, the document feeding is once cancelled, and after the restart of the feeding, a document is guided to the second conveyance path. If it is necessary to delay switching of the conveyance route, a document conveyance interval is narrow, and the document that was fed last before the input of the cancel instruction and a subsequent document are likely to be brought into contact with each other. For this reason, by once canceling the document feeding after the input of the cancel instruction, a document can be guided to the second conveyance path after the restart of the feeding while preventing the contact of documents with each other.

An image reader according to a seventh preferred embodiment of the present invention is, in addition to the above configuration, configured such that the document contact determination device determines on a basis of a document interval on the first conveyance path whether or not contact of the documents with each other occurs.

According to such a configuration, on the basis of the document conveyance interval, it is determined whether or not contact of the documents with each other occurs, and therefore the contact of the documents with each other can be prevented with accuracy.

An image reader according to an eighth preferred embodiment of the present invention is, in addition to the above configuration, provided with a paper feed path that conveys a document from the paper feed tray to the branch point; and a reading system specifying device adapted to be able to specify, as a reading system for the double-sided reading, a sequential system that does not simultaneously convey two or more documents on the U-turn path, and is configured such that if the cancel instruction is inputted during double-sided reading based on the sequential system, a document that is being conveyed through the paper feed path when the cancel instruction is inputted is discharged through the second conveyance path, and the document feeding device does not once cancel the document feeding.

According to such a configuration, in the sequential system in which the document interval is sufficiently wide, without canceling the document feeding, a document is discharged through the second conveyance path, and therefore the time necessary for the idle feeding process can be shortened.

An image reader according to a ninth preferred embodiment of the present invention is, in addition to the above configuration, provided with a reading system specifying device arranged to be able to specify, as a reading system for the double-sided reading, an alternate system that makes different documents enter the reading position alternately from the introduction path and the U-turn path, and configured such that if the cancel instruction is inputted during double-sided reading based on the alternate system, the route switching device selects the second conveyance path after a fore end of a document that was fed last before the input of the cancel instruction has arrived at the branch point, and the document feeding device once cancels the document feeding after the input of the cancel instruction, and then restarts the document feeding.

According to such a configuration, even in the alternate system in which the document interval is narrow, without bringing documents into contact with each other, the time necessary for the idle feeding process of the documents can be shortened.

An image reader according to a tenth preferred embodiment of the present invention is, in addition to the above configuration, provided with a reading system specifying device arranged to be able to specify, as a reading system for the double-sided reading, a batch system that makes two or more documents continuously enter the reading position from one of the introduction path and the U-turn path, and configured such that if the cancel instruction is inputted during double-sided reading based on the batch system, the route switching device selects the second conveyance path after a fore end of a document that was fed last before the input of the cancel instruction has arrived at the branch point, and the document feeding device once cancels the document feeding after the input of the cancel instruction, and then restarts the document feeding.

According to such a configuration, even in the batch system in which the document interval is narrow, without bringing documents into contact with each other, the time necessary for the idle feeding process of the documents can be shortened.

An image reader according to an eleventh preferred embodiment of the present invention is, in addition to the above configuration, configured such that the document feeding device feeds documents at narrower document intervals during the single-sided reading than the document interval for the double-sided reading, and if two or more documents are left on the paper feed tray when the cancel instruction for the double-sided reading is inputted, feeds the documents at the same document intervals as the document interval for the single-sided reading.

According to such a configuration, the documents are discharged at the document intervals for the single-sided reading, which are narrower than the document interval for the double-sided reading, and therefore the time necessary for the idle feeding process can be shortened.

A document conveying method according to a twelfth preferred embodiment of the present invention includes a reading specifying step of specifying any of double-sided reading and single-sided reading as a document reading method; a document feeding step of feeding a document from a paper feed tray; a cancel input step of inputting a cancel instruction for the double-sided reading; and a route switching step of, at a branch point between a first conveyance path for the double-sided reading and a second conveyance path for the single-sided reading, the second conveyance path being shorter than the first conveyance path, on a basis of the specified reading method, switching a document conveyance route, and on a basis of the cancel instruction, selecting the second conveyance path, and configured such that a document that is left on the paper feed tray when the cancel instruction is inputted is fed after the input of the cancel instruction, and discharged through the second conveyance path.

A document conveying method according to a thirteenth preferred embodiment of the present invention is, in addition to the above configuration, configured such that the first conveyance path includes an introduction path that conveys a document from the branch point to a reading position, and a U-turn path that causes the document having entered from the introduction path and passed through the reading position make a U-turn and again enter the reading position; the second conveyance path joins the first conveyance path at a junction point in the U-turn path without passing through the reading position; and if two or more documents are left on the paper feed tray when the cancel instruction is inputted, in the document feeding step, the documents are fed at document intervals that are narrower than a document interval for the double-sided reading before the input of the cancel instruction.

A document conveying method according to a fourteenth preferred embodiment of the present invention is, in addition to the above configuration, provided with a paper feed step of conveying a document from the paper feed tray to the branch point, and configured such that a document that is being conveyed by the paper feed step when the cancel instruction is inputted is discharged through the second conveyance path.

A document conveying method according to a fifteenth preferred embodiment of the present invention is, in the document feeding step, document feeding is once cancelled after the input of the cancel instruction and then restarted such that a fore end of a document that is fed first after the input of the cancel instruction arrives at the junction point after a rear end of a document that was fed last before the input of the cancel instruction has passed through the junction point.

In an image reader according to various preferred embodiments of the present invention, if the double sided reading of a document is cancelled, the idle feeding process that conveys a document left on the paper feed tray to the paper discharge tray is performed after the conveyance route has been switched to the second conveyance path for the single-sided reading. For this reason, in the idle feeding process, the conveyance path that is shorter than that for the double-sided reading before the cancellation can be used, and therefore the time necessary for the idle feeding process can be shortened.

Also, in an image reader according to various preferred embodiments of the present invention, if the double-sided reading of a document is cancelled, the conveyance route is switched to the second conveyance path for the single-sided reading, and also the idle feeding process is performed with use of the narrower document interval than that for the double-sided reading. For this reason, the time necessary for the idle feeding process can be shortened.

Further, in an image reader according to a preferred embodiment of the present invention, if the double-sided reading of a document is cancelled, the conveyance route is switched to the second conveyance path for the single-sided reading, and a document that is being conveyed on the upstream side of the branch point is guided to the second conveyance path. For this reason, a discharge process is performed with use of the shorter conveyance path than that for the double-sided reading before the cancellation, and therefore a time necessary for the discharge process can be shortened.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
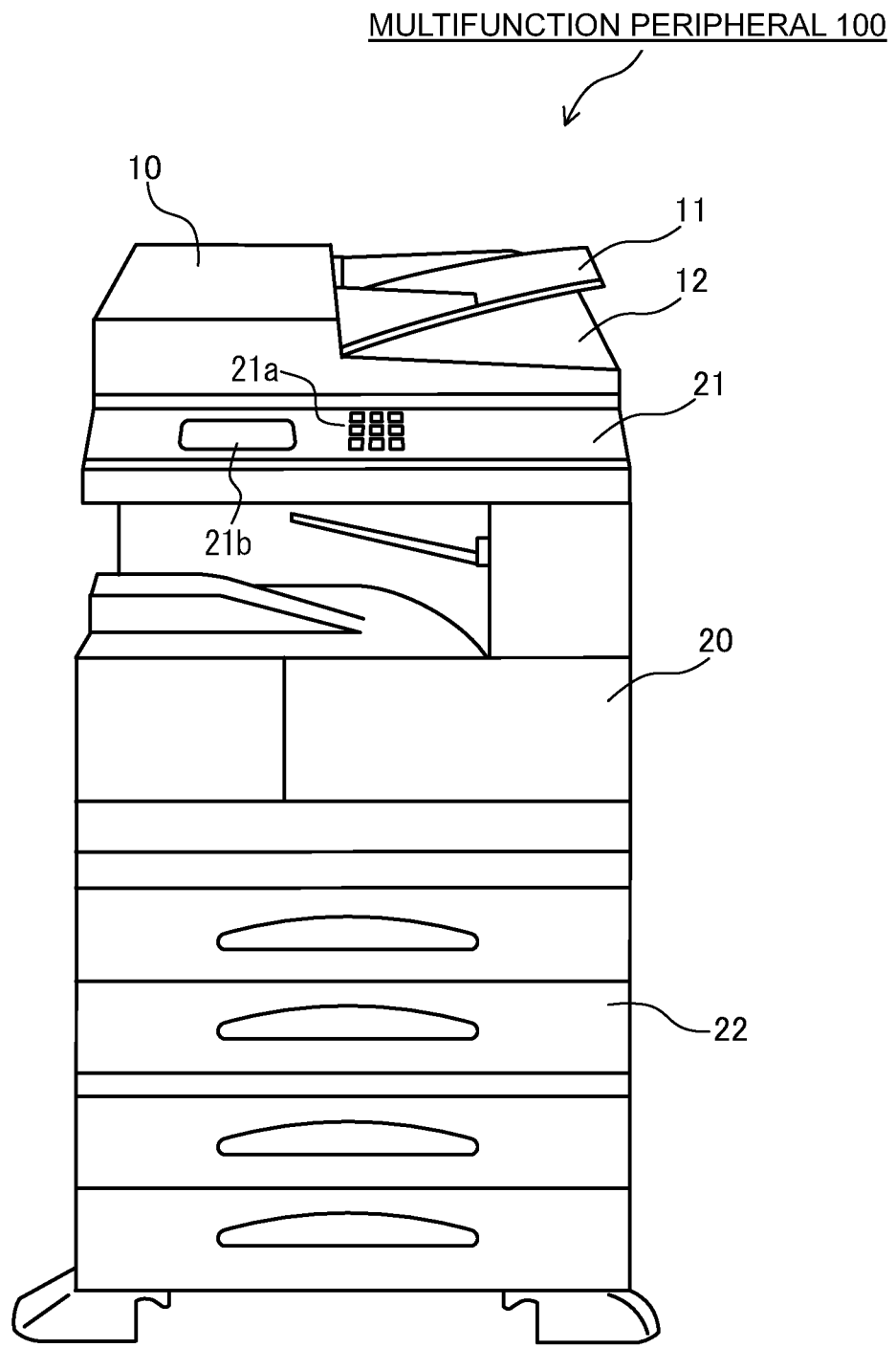
FIG. 1 is an appearance diagram illustrating one configuration example of an image reader according to a first preferred embodiment of the present invention, in which as one example of the image reader, a multifunction peripheral 100 is illustrated.

FIG. 1 is an appearance diagram illustrating one configuration example of an image reader according to a first preferred embodiment of the present invention, in which as one example of the image reader, a multifunction peripheral 100 is illustrated. The multifunction peripheral (MFP) 100 preferably includes an MFP main body 20 that performs image reading, printing, facsimile transmission/reception, and the like; and an ADF (Auto Document Feeder) device 10 that automatically conveys a document at the time of image reading.

An operation panel 21 of the MFP main body 20 preferably includes an operation input device 21a including a start key, numeric keys, and the like for a user to provide operation input; and a liquid crystal display 21b to provide a display output of an operational state to the user. For example, the user can specify any of single-sided reading or double-sided reading of a document by providing operation input to the operation input device 21a. Further, during document reading, the user can also issue an instruction to cancel the reading.

Also, on an upper surface of the MFP main body 20, an unillustrated contact glass is provided, and on the contact glass, the ADF device 10 is arranged so as to be openable and closable. That is, the multifunction peripheral 100 can read a document on the basis of any of a flat bed system that reads a document placed on the contact glass and an ADF system that reads a document currently automatically conveyed by the ADF device 10.

The ADF device 10 is provided with a paper feed tray 11 and a paper discharge tray 12, inside which a conveyance path is provided. Documents on the paper feed tray 11 are fed by being separated one by one; conveyed along the conveyance path; and discharged to the paper discharge tray 12. The conveyance path is arranged so as to pass over the contact glass of the MFP main body 20, and each of the documents is read by the MFP main body 20 when passing over the contact glass.

If, during document reading, the instruction to cancel the reading is issued, an idle feeding process that sequentially discharges documents placed on the paper feed tray 11 to the paper discharge tray 12 through the conveyance path is performed. This process results in convenience of saving the trouble of overlapping the documents placed on the paper feed tray 11 and documents discharged to the paper discharge tray 12.

Figure 2:
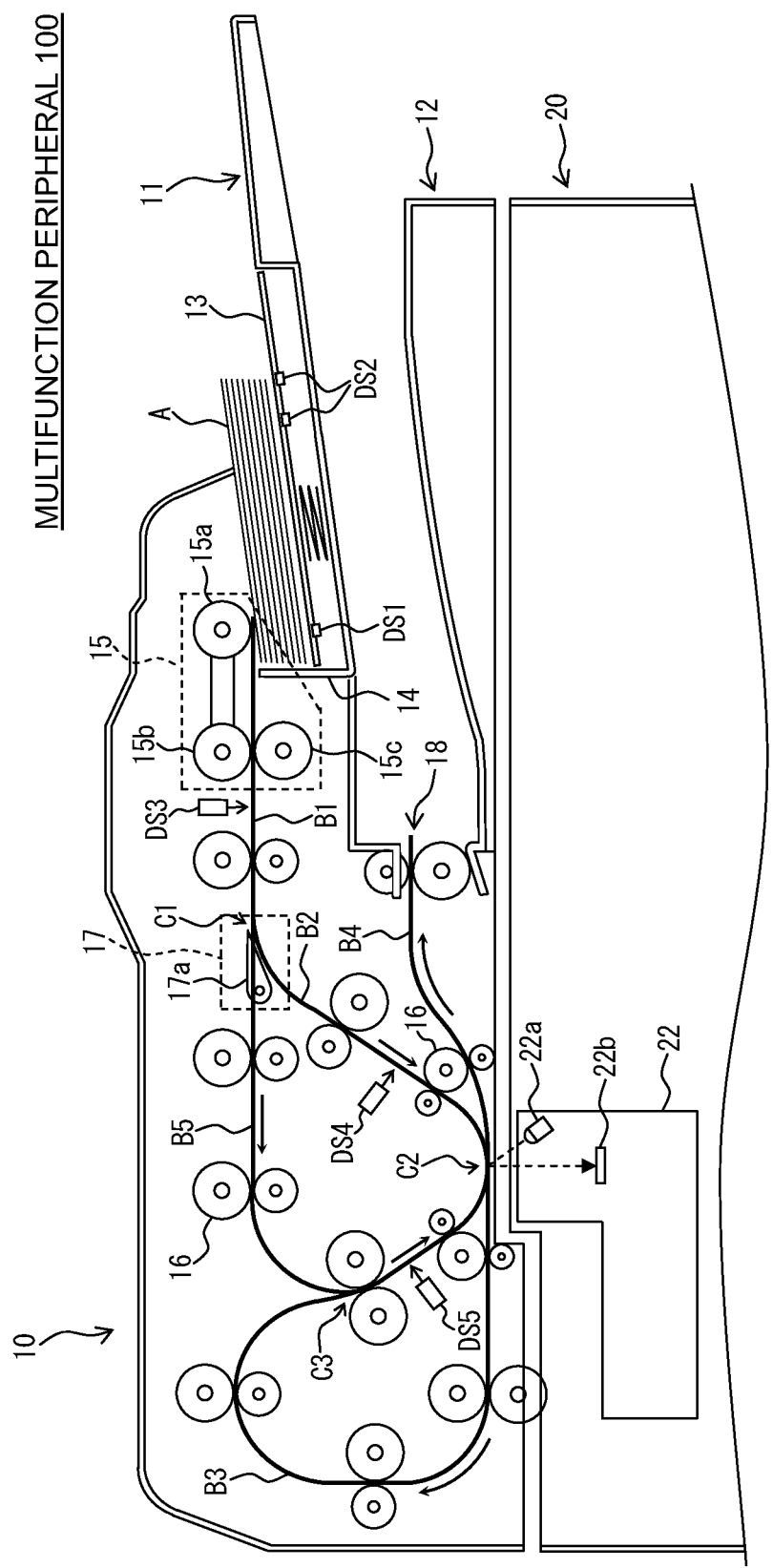
FIG. 2 is a cross-sectional view illustrating one configuration example of a main portion of the multifunction peripheral 100 in FIG. 1, in which mainly an internal structure of an ADF device 10 is schematically illustrated.

FIG. 2 is a cross-sectional view illustrating one configuration example of a main portion of the multifunction peripheral 100 in FIG. 1, in which mainly an internal structure of the ADF device 10 is schematically illustrated. B1 to B5 in the diagram indicate document conveyance paths, C1 a branch point between the conveyance paths B2 and B5, C2 a document reading position, and C3 a junction point of the conveyance paths B3 and B5.

A scanner unit 22 includes an image sensor that optically reads an image of a document A passing through the reading point C2, and includes a light projector 22a and a line sensor 22b. Irradiation light from the light projector 22a is reflected by the document A on the contact glass, and the reflected light is detected by the line sensor 22b in which a number of light receiving elements are linearly arranged. By relatively moving the document A and the line sensor 22b in a direction orthogonal to a direction of the arrangement, the two-dimensional image can be read. In the case of image reading based on the ADF system, image reading of the document A being conveyed is performed with the scanner unit 22 being kept still. Note that the scanner unit 22 can also be used as a document detecting sensor that detects arrival or passing of the document A with respect to the reading position C2.

The multifunction peripheral 100 preferably uses the two-pass one-scanner method, and uses the one scanner unit 22 to perform the double-sided reading of a document. The two-pass one-scanner method refers to a double-sided reading method that reverses a document to read the document twice with one and the same scanner unit 22. In a general image reader based on the two-pass one-scanner method, a document A is reversed by switching back the document; conveyed again just before the scanner unit 22 through another conveyance path; and made to pass over the scanner unit 22 twice in total in the same direction.

On the other hand, in the multifunction peripheral 100, the document A is made to perform a U-turn to be thereby reversed, and then made to pass over the scanner unit 22 twice in total. In this case, a direction in which the document A passes over the scanner unit 22 is opposite in the first and second passes.

In the ADF device 10, the conveyance paths B1 to B5 are provided, and a conveyance route for a document A is different in single-sided reading and the double-sided reading. In the case of performing the double-sided reading, the document is conveyed in the order of the conveyance paths B1, B2, B3, and B4. This conveyance route is hereinafter referred to as a double-sided path. On the other hand, in the case of performing the single-sided reading, the document is conveyed in the order of the conveyance paths B1, B5, B3, and B4. This conveyance route is hereinafter referred to as a single-sided path.

The conveyance path B1 is a paper feed path that conveys the document A having been fed from the paper feed tray 11 to the branch point C1, and used for both of the single-sided reading and double sided reading.

The conveyance path B2 is an introduction path exclusive for double-sided reading, which conveys the document A for double-sided reading from the branch point C1 to the reading point C2, and without performing a U-turn, conveys the document A to the reading position C2 almost linearly. The document that has entered from the conveyance path B2 and passed through the reading position C2 from right to left enters the conveyance path B3.

The conveyance path B3 is a U-turn path that causes the document for double-sided reading to perform a U-turn to reverse the document. The document that has passed through the reading position C2 from right to left enters a lower side of the conveyance path B3; is conveyed clockwise to be brought into a reversed state; then returns to the reading position C2 from an upper side of the conveyance path B3; and passes through the reading position C2 from left to right. That is, by passing through the conveyance path B3, the document can be made to pass through the reading position C2 in the state where the document is reversed, twice in total. In this case, a direction in which the document passes through the reading position C2 is opposite between the first and second passes. Note that, in the conveyance path B3, a downstream side of the junction point C3 is also used for single-sided reading.

The conveyance path B4 is a discharge path that conveys the document having passed through the reading position C2 from left to right to a discharge port 18, and then discharges the document to the paper discharge tray 12, and used for both of the single-sided reading and double-sided reading.

The conveyance path B5 is an introduction path exclusive for single-sided reading, which conveys the document A for single-sided reading from the branch point C1 to the junction point C3 on the conveyance path B3, and defines a laterally-facing U-shaped conveyance path together with the conveyance path B3. The document for single-sided reading that has entered the conveyance path B3 from the junction point C3 passes through the reading position C2 from left to the right, enters the conveyance path B4, and is discharged to the paper discharge tray 12 just as with the document for double-sided reading. Regarding a conveyance distance from the branch point C1 to the junction point C3, the distance for the case of conveyance through the conveyance path B5 is shorter than that for the case of conveyance through the conveyance paths B2 and B3. That is, regarding a conveyance distance from the branch point C1 to a point where the document is discharged, the distance for the case of the single-sided path is shorter than that for the case of the double-sided path.

The paper feed tray 11 preferably includes a document stage 13 to stack and place documents; and a document stopper 14 to position the documents. The document stage 13 is biased upward by a biasing member such as a spring to bring an uppermost document into contact with a pickup roller 15a. Also, regarding the documents on the document stage 13, fore ends (in the diagram, left ends) thereof in a feeding direction are positioned by the document stopper 14. For this reason, the uppermost document is in a state where the fore end thereof is positioned and a vicinity of the fore end is pressed against the pickup roller 15a.

A document feeding device 15 is arranged to feed the documents A on the paper feed tray 11 to the conveyance path one by one, and includes the pickup roller 15a, the separation roller 15b, and the retard roller 15c. The pickup roller 15a and the separation roller 15b are rotationally driven in the document feeding direction, and the retard roller 15c is rotationally driven in a backward direction. For this reason, the documents A on the paper feed tray 11 are fed by the pickup roller 15a to the conveyance path B1 sequentially from the top, and among the documents A that have been fed in a multiple feeding state, only the uppermost document A is separated by the separation roller 15b and retard roller 15c that rotate in directions opposite to each other, and then conveyed in the feeding direction.

A conveying roller 16 preferably includes a driving roller that is rotationally driven; and a driven roller that is arranged with facing to the driving roller with sandwiching the conveyance path. In the conveyance paths B1 to B5, a number of conveying rollers 16 are arranged at intervals shorter than a shortest document length, and a document A is conveyed on the conveyance paths by these conveying rollers 16. Note that the conveying rollers 16 are rotationally driven by unillustrated conveying motors 36; however, in order to drive some of the conveying motors 36 asynchronously with the rest of the conveying motors 36, a dedicated clutch and the like are required, which complicates a configuration and increases cost. For this reason, in the present preferred embodiment, it is assumed that all of the conveying rollers 16 are driven by one and the same stepping motor, and rotated synchronously with one another.

A path switching device 17 defines a conveyance route switching device and is arranged to select any of the single-sided and double-sided paths, and arranged at the branch point C1 between the conveyance routes. The path switching device 17 is configured to have a claw-shape rotating member 17a and an unillustrated solenoid, and the solenoid rotationally moves the rotating member 17a to thereby switch between the conveyance paths B2 and B5. That is, in the case where the double-sided path is selected, a document A having arrived at the branch point C1 is conveyed to the conveyance path B2, whereas in the case where the single-sided path is selected, the document A having arrived at the branch point C1 is conveyed to the conveyance path B5.

Assuming that lower and upper surfaces of the document A included in the paper feed tray 11 are respectively referred to as first and second surfaces, in the case of the double-sided path, the document A is read twice in the order of the first and second surfaces, whereas in the case of the single-sided path, only the second surface of the document A is read. That is, in the case where the double-sided path is selected, the document A is guided to the reading position C2 of the scanner unit 22 by passing sequentially through the conveyance path B1, the branch point C1, and the conveyance path B2, where the first surface thereof is read. Then, the document A is guided again to the reading position C through the conveyance path B3, where the second surface thereof is read, and then discharged from the discharge port 18 through the conveyance path B4. On the other hand, in the case where the single-sided path is selected, the document A is guided to the reading position C2 of the scanner unit 22 by passing sequentially through the conveyance path B1, the branch point C1, the conveyance path B5, the junction point C3, and a last half section of the conveyance path B3, where the second surface thereof is read, and then discharged from the discharge port 18 through the conveyance path B4.

The ADF device 10 is preferably provided with five document detecting sensors DS1 to DS5, for example. The document detecting sensors DS1 and DS2 are provided in the paper feed tray 11 to detect a document A placed on the document stage 13. On the other hand, the document detecting sensors DS3 to DS5 respectively detect arrival or passing of the document A being conveyed at different detecting positions. Note that, for each of these document detecting sensors DS1 to DS5, an optical sensor can be used, for example.

The document detecting sensor DS1 defines a document placement detecting sensor and is arranged to detect whether or not a document A is placed on the paper feed tray 11. For example, if a reflective type optical sensor is buried in the document stage 13 near the document stopper 14 to detect the vicinity of the fore end of the document A, the presence or absence of the document A can be determined.

The document detecting sensor DS2 preferably includes two document length detectors that are adapted to detect a length of the document A in the feeding direction and can respectively detect different document lengths. For example, by burying optical sensors in the document stage 13 posterior to the document detecting sensor DS1, it can be determined whether or not a document length is equal to or more than a predetermined length. In this case, if two or more documents A having different sizes are placed while being stacked, the longest document length is detected.

The document detecting sensors DS3 to DS5 define document conveyance state detectors and are arranged to monitor predetermined detecting positions in the conveyance paths to detect a position of the document A being conveyed, and detect arrival or passing of the document A with respect to the detecting positions. That is, when the fore end of the document A is detected, it can be determined that the document A has arrived at a corresponding detecting position, whereas when a rear end of the document A is detected, it can be determined that the document A has passed through the detecting position.

The document detecting sensor DS3 is arranged over the conveyance path B1 that is sandwiched between the separation roller 15b and the branch point C1, and detects the document A that is fed from the paper feed tray 11 to the conveyance path B1 by the document feeding device 15.

The document detecting sensor DS4 is arranged over the conveyance path B2 that is sandwiched between the branch point C1 and the reading position C2. The document detecting sensor DS4 is a sensor arranged to determine a timing to read the first surface by the scanner unit 22, and arranged at a position through which the fore end of the document A passes just before arriving at the reading position C2.

The document detecting sensor DS5 is arranged over the conveyance path B3 that is sandwiched between the junction point C3 and the reading position C2. The document detecting sensor DS5 is a sensor arranged to determine a timing to read the second surface by the scanner unit 22, and arranged at a position through which the fore end of the document A passes just before arriving at the reading position C2.

Alternatively, to detect the document A being conveyed, not only the document detecting sensors DS3 to DS5, but the scanner unit 22 can also be used. That is, the scanner unit 22 can also be used as a document detecting sensor to detect arrival or passing of the document A with respect to the reading position C2.

During document conveyance, a user may issue the instruction to cancel reading. In the case where the instruction to cancel reading is issued, the multifunction peripheral 100 discharges documents on the conveyance paths B1 to B5 and the paper feed tray 11 to the paper discharge tray 12. In this case, by changing a direction of the claw-shaped rotating member 17a of the path switching device 17, the conveyance route is switched from the double-sided path to the single-sided path. For this reason, a document that is being conveyed on an upstream side of the branch point C1 at the time of the reading cancellation is conveyed through the single-sided path that is shorter than the double-sided path, and thereby a document discharge time can be shortened.

FIGS. 3A to 6F are explanatory diagrams illustrating situations for the case of using the ADF device 10 in FIG. 2 to perform continuous reading of two or more double-sided documents A1 to A4. In general, the ADF device 10 simultaneously conveys two or more documents to be thereby able to shorten a reading time per document at the time of continuous reading. In the case of the ADF device 10, the double-sided path intersects with itself, and therefore a plurality of reading systems can be considered, depending on an order in which the double-sided documents A1 to A4 that are sequentially fed pass through the reading position C2. In the present preferred embodiment, it is assumed that any one of a sequential system, a batch system, and an alternate system is selected by a user. Note that, on the basis of a document size detected on the paper feed tray 11 by the document detecting sensor DS2, any of the reading systems may be selected.

FIGS. 3A-3D are explanatory diagrams of the continuous reading based on the sequential system, and conveyance states of the documents A1 and A2 on the conveyance paths B1 to B5 are illustrated in a time series order. In the sequential system, on the conveyance path B3 for performing a U-turn, two or more documents are not simultaneously conveyed, and reading of the subsequent document A2 is started after both sides of the preceding document A1 have been read.

Figure 3:
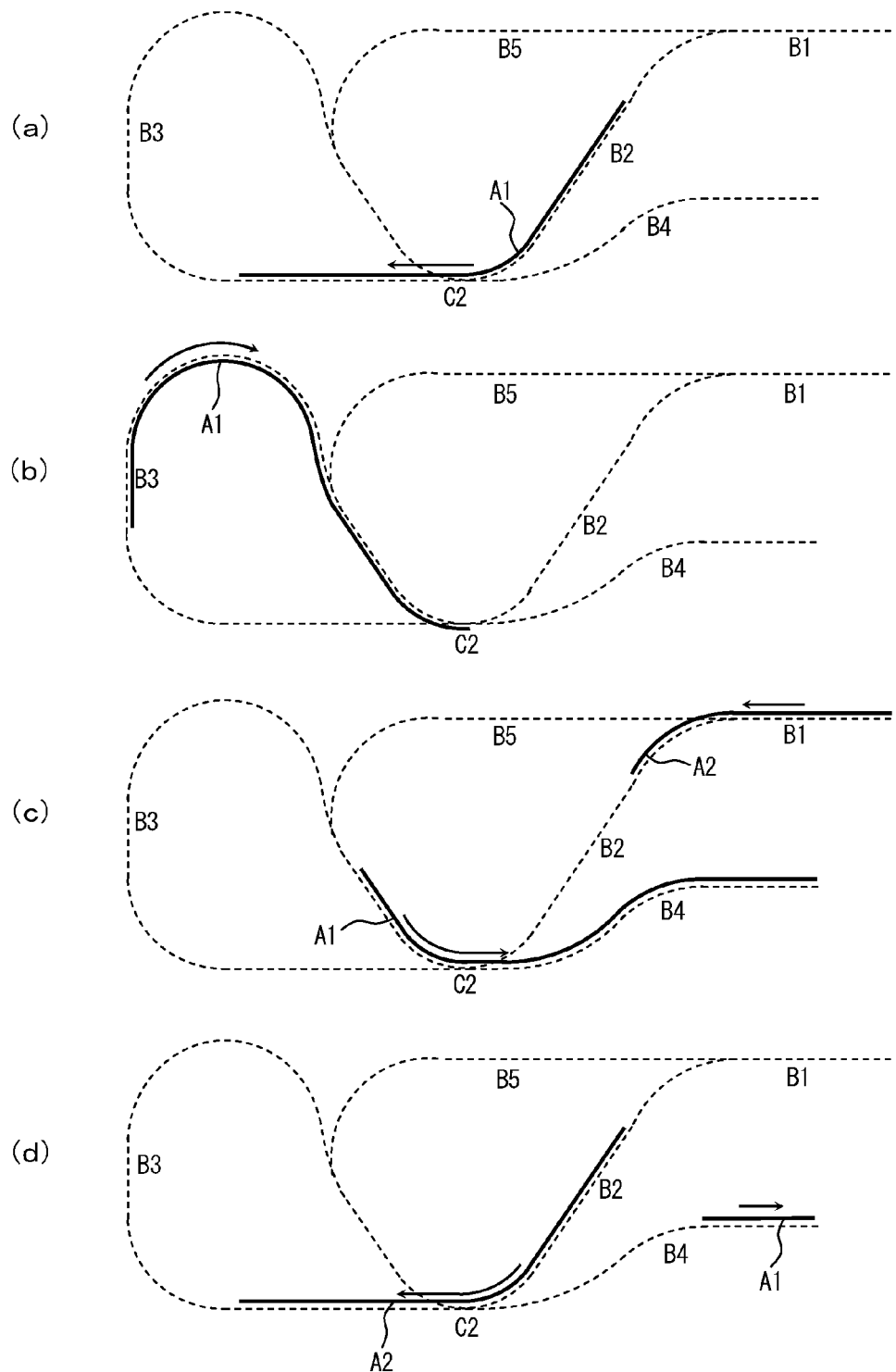
FIG. 3 is an explanatory diagram of continuous reading based on a sequential system, in which conveyance states of documents A1 and A2 on conveyance paths B1 to B5 are illustrated.

As illustrated in (a) through (c) of FIG. 3, the document A1 having been first fed is conveyed sequentially on the conveyance paths B1 to B3, and passes through the reading position C2 twice. Also, as illustrated in (c) and (d) of FIG. 3, the subsequent document A2 is fed before the preceding document A1 is discharged to the paper discharge tray 12 such that after the document A1 has passed through the reading position C2 twice, the document A2 arrives at the reading position C2.

The sequential system is a reading system that, before the preceding document A1 is discharged, starts to feed the subsequent document A2 to thereby shorten the reading time per document. The sequential system is applicable if a document length is equal to or less than a length of the conveyance path B3, and therefore suitable for high speed reading of relatively long documents. However, a document interval equal to or more than the path length of the conveyance path B3 should be kept, and therefore as compared with the single-sided reading and two systems described below, a conveyance time per document is long.

Figure 4:
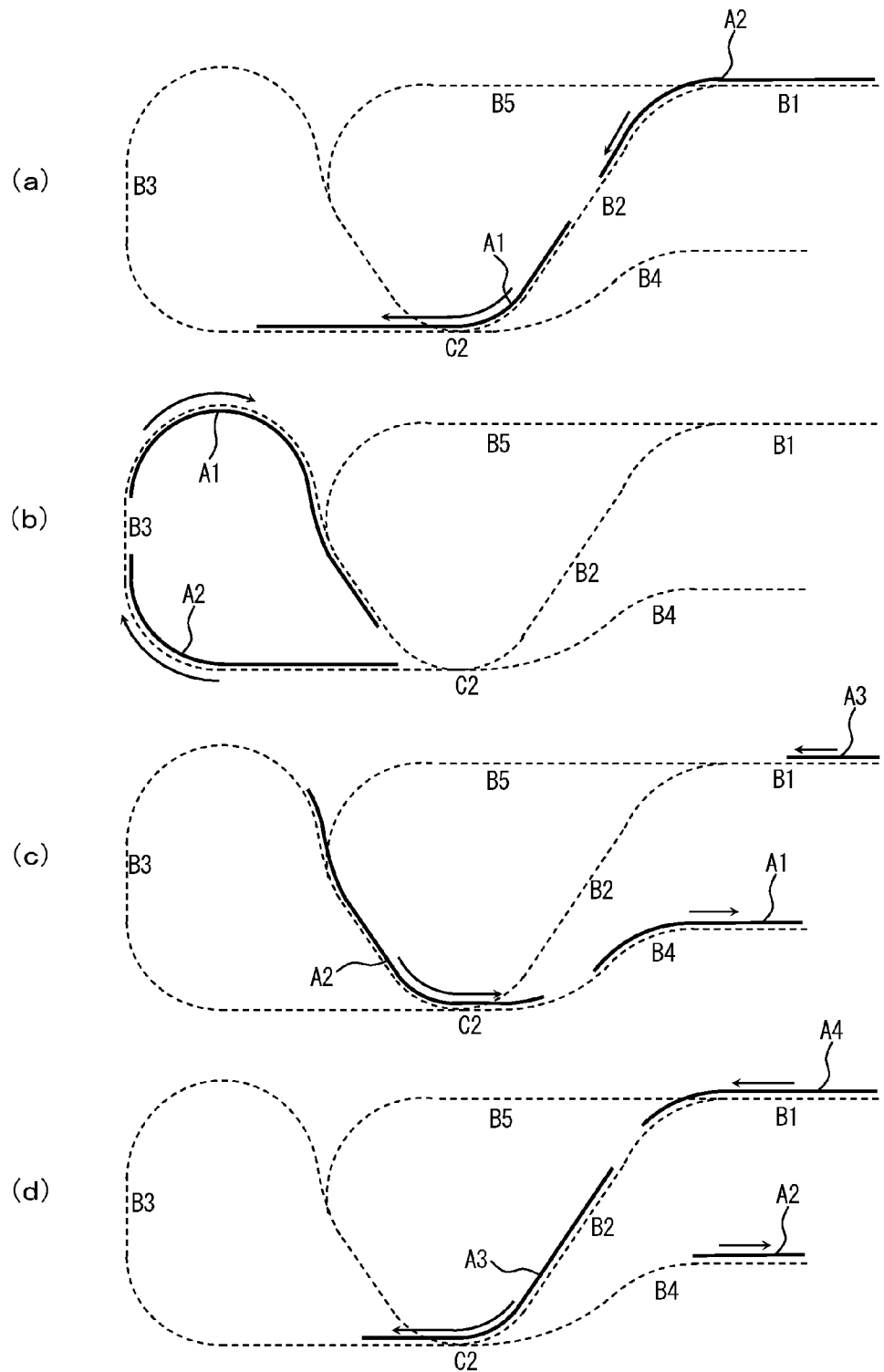
FIG. 4 is an explanatory diagram of double-sided reading based on a batch system, in which conveyance states of documents A1 to A4 on the conveyance paths B1 to B5 are illustrated.

FIG. 4 is an explanatory diagram of the double-sided reading based on the batch system, and conveyance states of the documents A1 to A4 on the conveyance paths B1 to B5 are illustrated in a time series order. In the batch system, on the conveyance path B3 for U-turn, two or more document A1 and A2 are simultaneously conveyed without being overlapped, and double-sided reading of a group of these documents is performed as a unit. That is, regarding the preceding documents A1 and A2, after the first surfaces have been read, the second surfaces of the documents A1 and A2 are read, and reading of the subsequent document A3 is started after the both sides of the preceding documents A1 and A2 have been read.

As illustrated in (a) and (b) of FIG. 4, the documents A1 and A2 having been sequentially fed are conveyed sequentially on the conveyance paths B1 to B3, and after the first surfaces of them have been read, they are brought into a state of being simultaneously conveyed on the conveyance path B3. After that, the documents A1 and A2 are conveyed to the conveyance path B4 through the reading position C2, and then the second surfaces of them are read as shown in (c) of FIG. 4. The subsequent documents A3 and A4 are fed before the preceding document A2 is discharged to the paper discharge tray 12 such that after both of the documents A1 and A2 have passed through the reading position C2 twice, the document A3 arrives at the reading position C2.

The batch system preferably is a reading system that continuously feeds the documents to the reading position C2 from one sides of the conveyance paths B2 and B3 and simultaneously conveys the two or more documents on the conveyance path B3 to thereby collectively perform the double-sided reading of the two or more documents A1 and A2, and before the documents A1 and A2 are both discharged, starts to feed the subsequent document A3 to thereby shorten the reading time per document. The batch system can further shorten the reading time per document as compared with the sequential system; however, it is not applicable unless a document length is equal to or less than about ½ of the length of the conveyance path B3. In the batch system, two or more document intervals including a document interval equal to or more than the path length of the conveyance path B3 are repeated, and if the document intervals are averaged, the averaged document interval is longer than a document interval for the case of the single-sided reading, so that as compared with the single-sided reading, the conveyance time per document is long.

Figure 5:
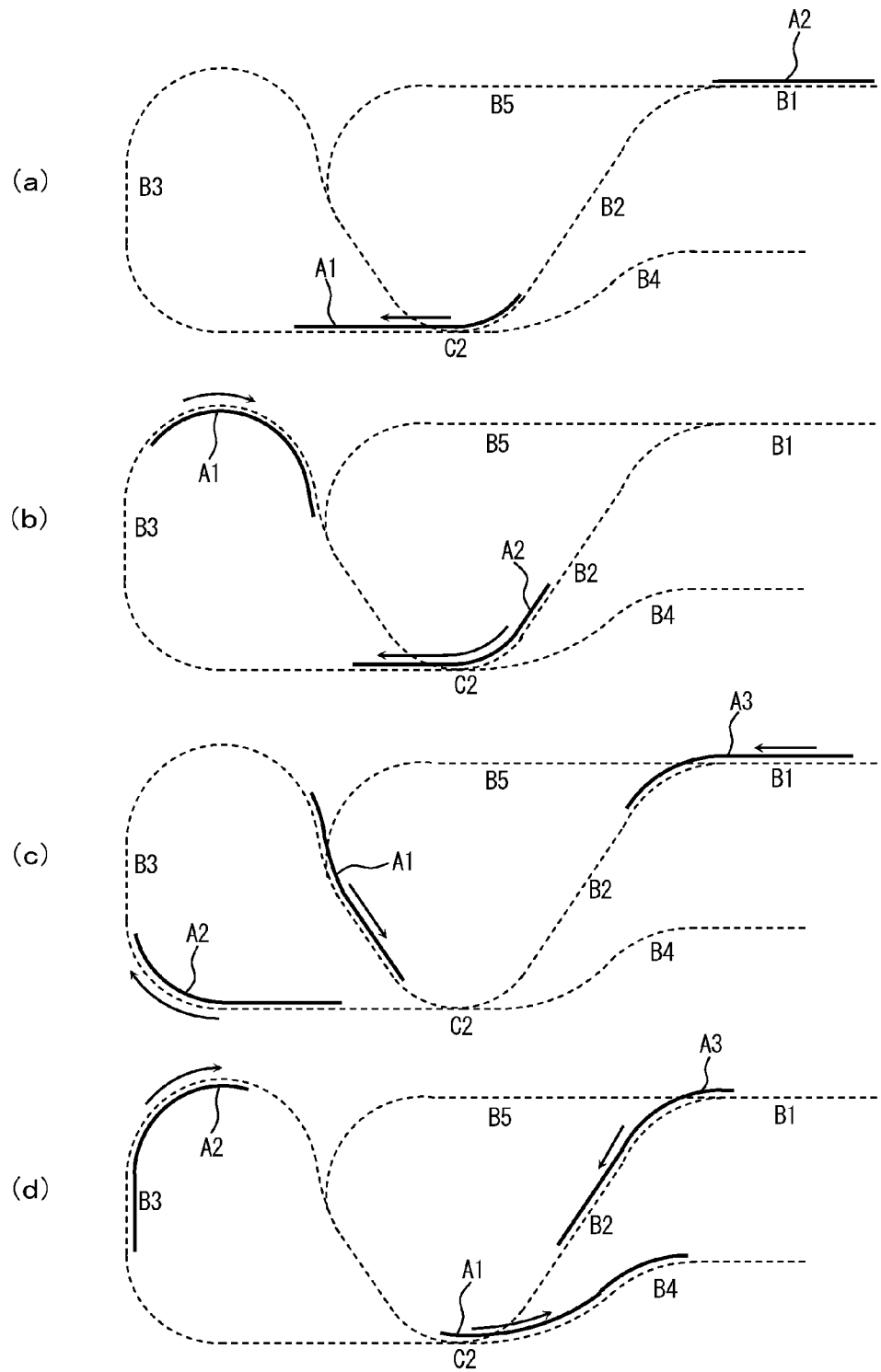
FIG. 5 is an explanatory diagram of double-sided reading based on an alternate system, in which conveyance states of documents A1 to A4 on the conveyance paths B1 to B5 are illustrated.
Figure 6:
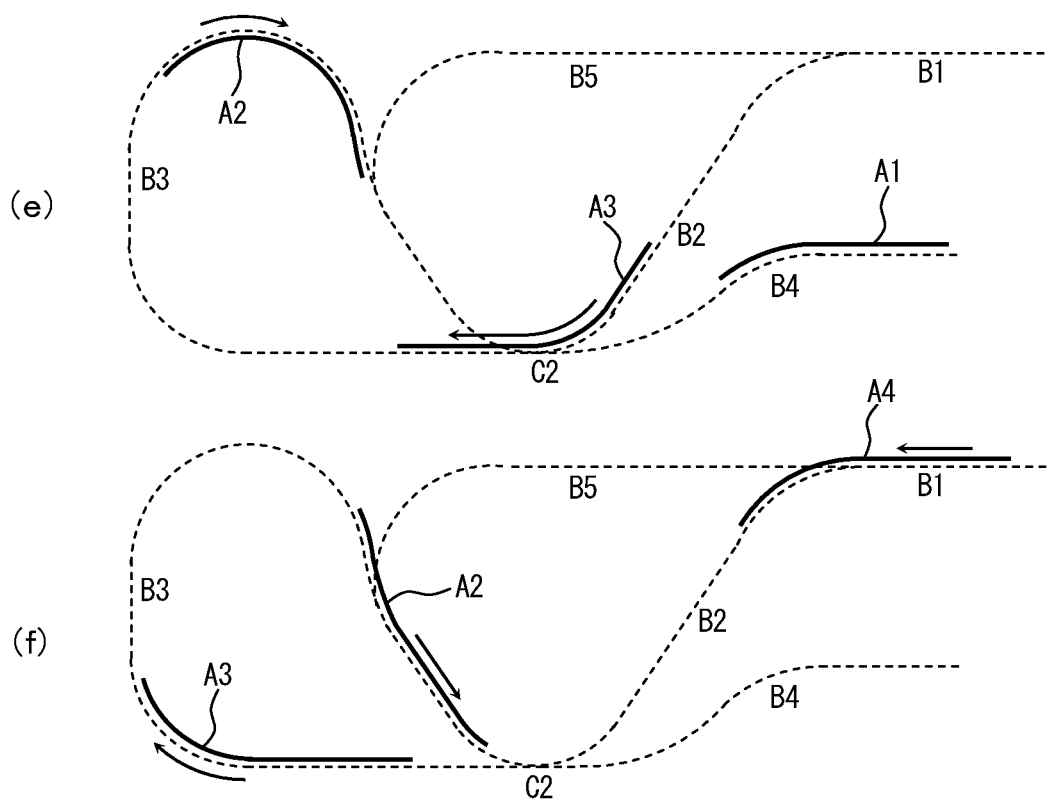
FIG. 6 is an explanatory diagram of the double-sided reading based on the sequential system, in which the conveyance states of the documents A1 to A4 on the conveyance paths B1 to B5 are illustrated.

Portions (a) through (f) of FIGS. 5 and 6 are explanatory diagrams of the double-sided reading based on the alternate system, and conveyance states of the documents A1 to A4 on the conveyance paths B1 to B5 are illustrated in a time series order. In the alternate system, on the conveyance path B3 for U-turn, two or more documents A1 and A2 are simultaneously conveyed at an interval, and documents are fed to the reading position C2 alternately from the conveyance paths B2 and B3.

As illustrated in portions (a) through (c) of FIG. 5, the documents A1 and A2 having been sequentially fed are conveyed sequentially on the conveyance paths B1 to B3, and after the first surfaces of the documents A1 and A2 have been read, they are brought into a state of being simultaneously conveyed on the conveyance path B3. As compared with the batch system in FIG. 4, the alternate system is the same in that it is a reading system that simultaneously conveys two or more documents on the conveyance path B3 for performing a U-turn, but different in that between the documents A1 and A2, an interval of a length of one document or more is formed. That is, in the alternate system, the documents A1 and A2 are sequentially fed at the interval of the length of one document or more.

Then, the document A1 enters the reading position C2 from the conveyance path B3, where the second surface thereof is read as shown in (d) of FIG. 5. When the document A1 is conveyed to the conveyance path B4, the document A3 enters the reading position C2 from the conveyance path B2, where the first surface thereof is read as shown in (e) of FIG. 6. After that, when the document A3 is conveyed to the conveyance path B3, the document A2 enters the reading position C2 from the conveyance path B3, where the second surface thereof is read as shown in (f) of FIG. 6. That is, at the reading position C2, the second surface of the document A1, the first surface of the document A3, and the second surface of the document A2 are sequentially read. Portions (c) and (f) of FIGS. 5 and 6 illustrate the same state except that the set of documents in (c) of FIG. 5 is replaced by the next set of documents in (f) of FIG. 6, and after the state shown in (f) of FIG. 6, by sequentially repeating the states shown in (c) to (f) of FIGS. 5 and 6, the continuous reading can be performed.

The alternate system preferably is a reading system that simultaneously conveys two or more documents on the conveyance path B3, and at the reading position C2, alternately reads first and second surfaces, and that shortens the reading time per document. In the alternate system, three or more documents are simultaneously conveyed at document intervals that are equal to or more than a document length and less than the path length of the conveyance path B3, and different documents are fed to the reading position C2 alternately from the conveyance paths B2 and B3. The alternate system can further shorten the reading time per document as compared with the batch system; however, a document length should be equal to or less than about ⅓ of the length of the conveyance path B3. Also, in the alternate system, a document interval equal to or more than a document length should be kept, and therefore as compared with the single-sided reading, a document interval is long and a conveyance time is also long.

Figure 7:
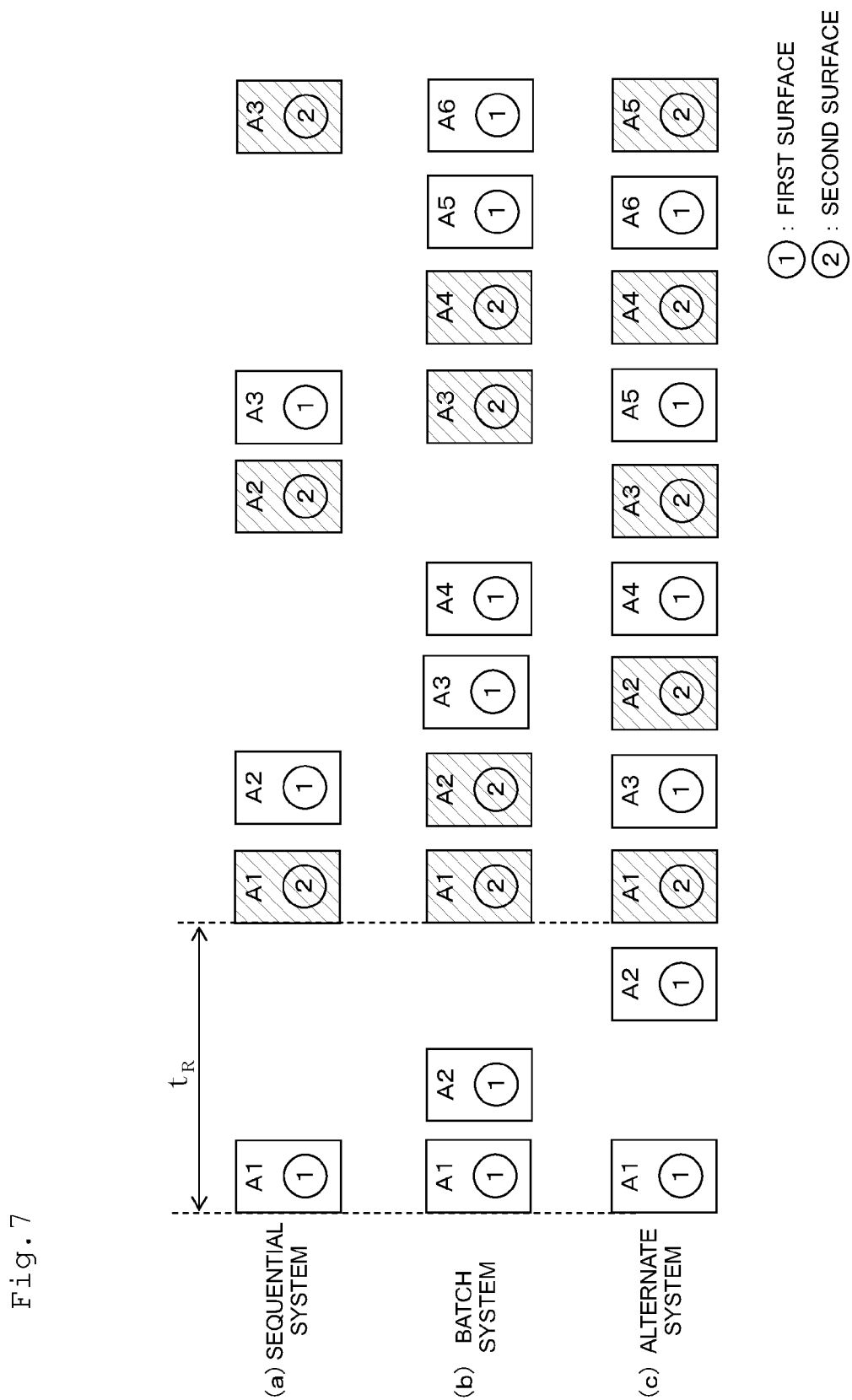
FIG. 7 is an explanatory diagram illustrating one example of a reading order in each of the continuous reading systems.

FIG. 7 is an explanatory diagram illustrating one example of a reading order at the reading position C2 in each of the continuous reading systems. Portions (a) to (c) of FIG. 7 illustrate reading orders of document surfaces of the documents A1 to A5 that are sequentially fed in the cases of the sequential, batch, and alternate systems, respectively.

In the case of the sequential system, as illustrated in portion (a) of FIG. 7, after the first and second surfaces of the document A1 have been sequentially read, the first and second surfaces of the document A2 are sequentially read. A time $t_R$ from the first surface reading to second surface reading of the same document corresponds to a time for the document A2 to pass through the conveyance path B3.

In the case of the batch system, as illustrated in (b) of FIG. 7, after the first surfaces of the documents A1 and A2 have been sequentially read, the second surfaces of the documents A1 and A2 are sequentially read. The time $t_R$ from the first surface reading to second surface reading of the same document A1 is the same as that for the case of the sequential system; however, during the time $t_R$, the first surface of the document A2 is read. For this reason, a document reading throughput can be further improved as compared to the case of the sequential system.

In the case of the alternate system, as illustrated in (c) of FIG. 7, except for the document A1 that has no preceding document, during a time from first surface reading to second surface reading of the same document, other two documents are read. For example, during a time from the first surface reading to second surface reading of the document A2, the second surface of the document A1 and the first surface of the document A3 are read. In this manner, by alternately reading a first surface of a document and a second surface of a different document, the document reading throughput can be further improved than the case of the batch system.

Figure 8:
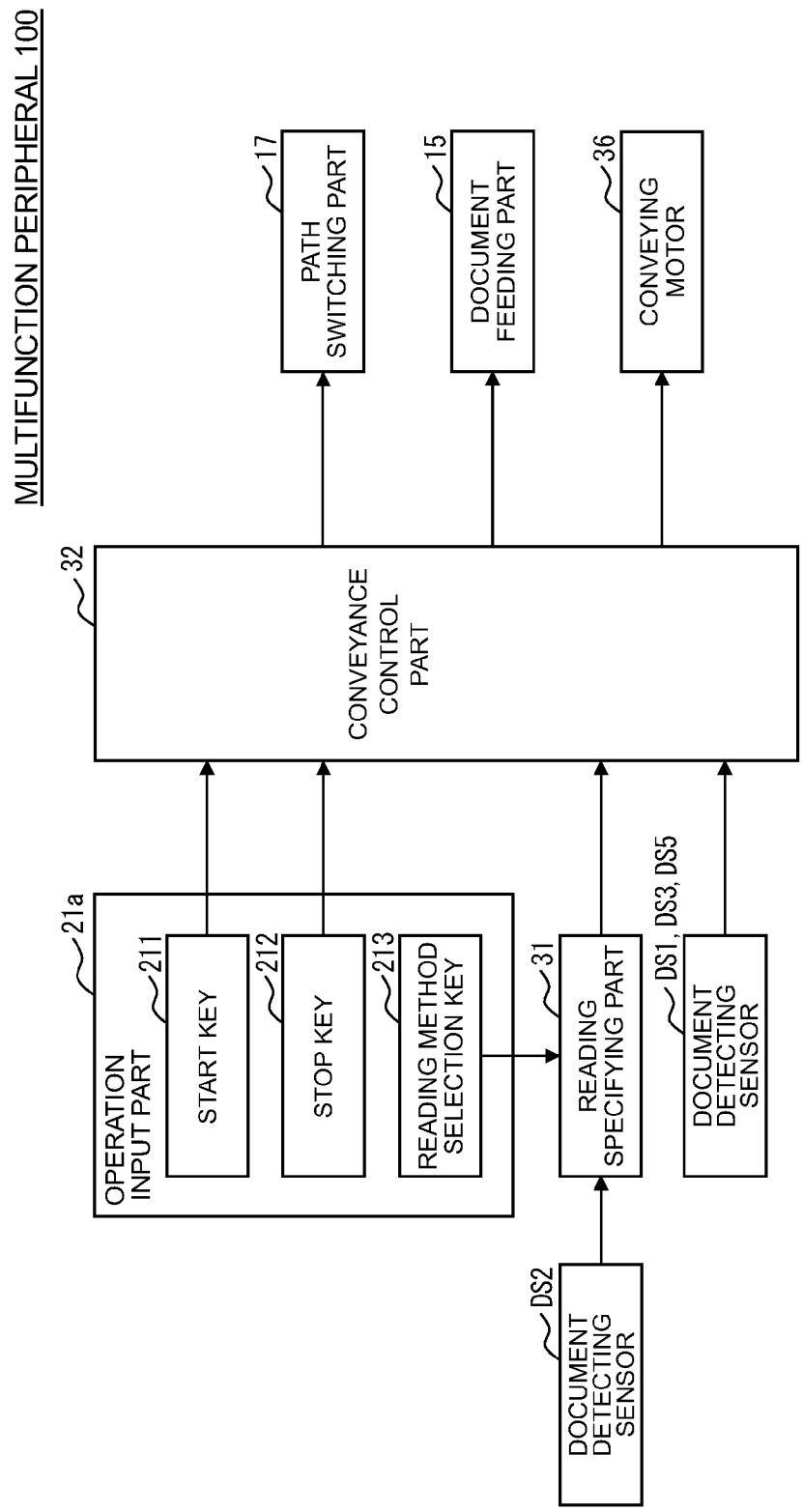
FIG. 8 is a block diagram illustrating the configuration example of the main portion of the multifunction peripheral 100 in FIG. 1.

FIG. 8 is a block diagram illustrating the configuration example of the main portion of the multifunction peripheral 100 in FIG. 1. The multifunction peripheral 100 preferably includes an operation input device 21a, the document detecting sensors DS1 to DS3 and DS5, the reading specifying device 31, the conveyance control device 32, the path switching device 17, the document feeding device 15, and the conveying motor 36.

In the operation input device 21a, a start key 211, a stop key 212, and a reading method selection key 213 are preferably provided. The start key 211 is a start input device arranged to input an instruction to start document reading. When a user sets two or more documents on the paper feed tray 11 and operates the start key 211, the continuous reading that sequentially reads these documents is started.

The stop key 212 is a cancel input device arranged to input an instruction to cancel document reading. When a user operates the stop key 212 while performing continuous reading, the user can cancel the continuous reading that is being performed. Differently from reading cancellation due to detection of an error such as a paper jam, in the case where the user issues the cancel instruction to cancel document reading, the discharge and idle feeding processes of documents before completion of reading are performed. In addition, in the case where a cancel instruction signal is inputted from an unillustrated user terminal, the completely same processes as those performed when the stop key 212 is operated are also performed.

The reading method selection key 213 is an input device arranged to select a document reading method. As the reading method, a user can select any of the double-sided reading and single-sided reading. Also, in the case of selecting the double-sided reading, the user can further select any of the sequential, batch, and alternate systems.

The reading specifying device 31 specifies a document reading method on the basis of a user specification and document length. The single-sided or double-sided reading is specified according to a user specification through the reading method selection key 213. As a reading system for the case of the double-sided reading, also in consideration of a document length detected by the document detecting sensor DS2, any of the sequential, batch, and alternate systems is specified. That is, in the case where a user specifies a reading system for the case of the double-sided reading, on the basis of a document length, it is determined whether or not reading based on the reading method is possible, and if the reading is possible, the reading system specified by the user is directly used, whereas if the reading is impossible, the reading system is changed to a readable reading system that is different from that specified by the user. For example, in the case where the user specifies the double-sided reading based on the alternate system, and a document length exceeds about ⅓ of the conveyance path B3 for U-turn, the reading specifying device 31 specifies the batch or sequential system in place of the alternate system.

The conveyance control device 32 outputs control signals to the path switching device 17, the document feeding device 15, and the conveying motor 36 to perform conveyance control of a document. Targets of the conveyance control include not only a normal conveyance process before reading cancellation but also the discharge and idle feeding processes after the reading cancellation.

The conveyance control device 32 outputs to the path switching device 17 a path specifying signal that specifies any of the double-sided and the single-sided paths, and thereby controls conveyance route switching. At the time of normal document reading, on the basis of a reading method specified by the reading specifying device 31, the conveyance control device 32 specifies any of the double-sided path and the single sided path, which corresponds to the reading method. On the other hand, if the stop key 212 is operated during double-sided reading, the conveyance control device 32 specifies the single-sided path until the subsequent discharge and idle feeding processes are completed. The single-sided path is shorter than the double-sided path, and therefore by specifying the single-sided path in the discharge and idle feeding processes that are performed after the double-sided reading has been cancelled, times necessary for the discharge and idle feeding processes can be shortened.

Also, the conveyance control device 32 outputs to the document feeding device 15 a feeding signal that indicates document feeding timing, and thereby controls a document interval. At the time of normal document reading, the conveyance control device 32 specifies document feeding at predetermined timing so as to achieve a document interval corresponding to a reading method specified by the reading specifying device 31. On the other hand, if the stop key 212 is operated during double-sided reading, the conveyance control device 32 controls the document feeding timing so as to achieve a document interval for single-sided reading until the subsequent idle feeding process is completed. The document interval for single-sided reading is narrower than a document interval in any of the reading systems for double-sided reading, and therefore by using the document interval for single-sided reading in the discharge and idle feeding process that are performed after the double-sided reading has been cancelled, the times necessary for the discharge and idle feeding processes can be shortened. In particular, as the number of documents subjected to the idle feeding process increases, a larger effect can be obtained.

Further, the conveyance control device 32 outputs a drive signal to the conveying motor 36, and thereby rotates the rollers 16 that are connected to a drive shaft of the conveying motor 36. That is, on the basis of an operation of the start key 211, the conveyance control device 32 starts to rotate the conveying motor 36, and on the basis of a result of detection by the document detecting sensor DS1, stops the rotation after all documents on the paper feed tray 11 have been discharged to the paper discharge tray 12. That is, even in the case where the stop key 211 is operated, the conveying motor 36 keeps rotating without stop until the discharge and idle feeding process are completed.

The path switching device 17 changes a direction of the claw-shaped rotating member 17a on the basis of the path specifying signal from the conveyance control device 32, and thereby switches a document conveyance route to the double-sided or single-sided path. In the case where the cancel instruction is inputted during double-sided reading, the path switching device 17 quickly switches the conveyance route to guide a document on the conveyance path B1 to the single-sided path. Accordingly, the document being conveyed on the upstream side of the branch point C1 at the time of reading cancellation is discharged through the single-sided path, and thereby the time necessary for the discharge process can be shortened. In addition, if, at the time of conveyance route switching, there is a document that is passing through the branch point C1, the document is conveyed to a conveyance route before the conveyance route switching through a state where the rotating member 17a comes into contact with the document. At this time, the contact of the rotating member 17a does not cause significant damage to the document.

Figure 9:
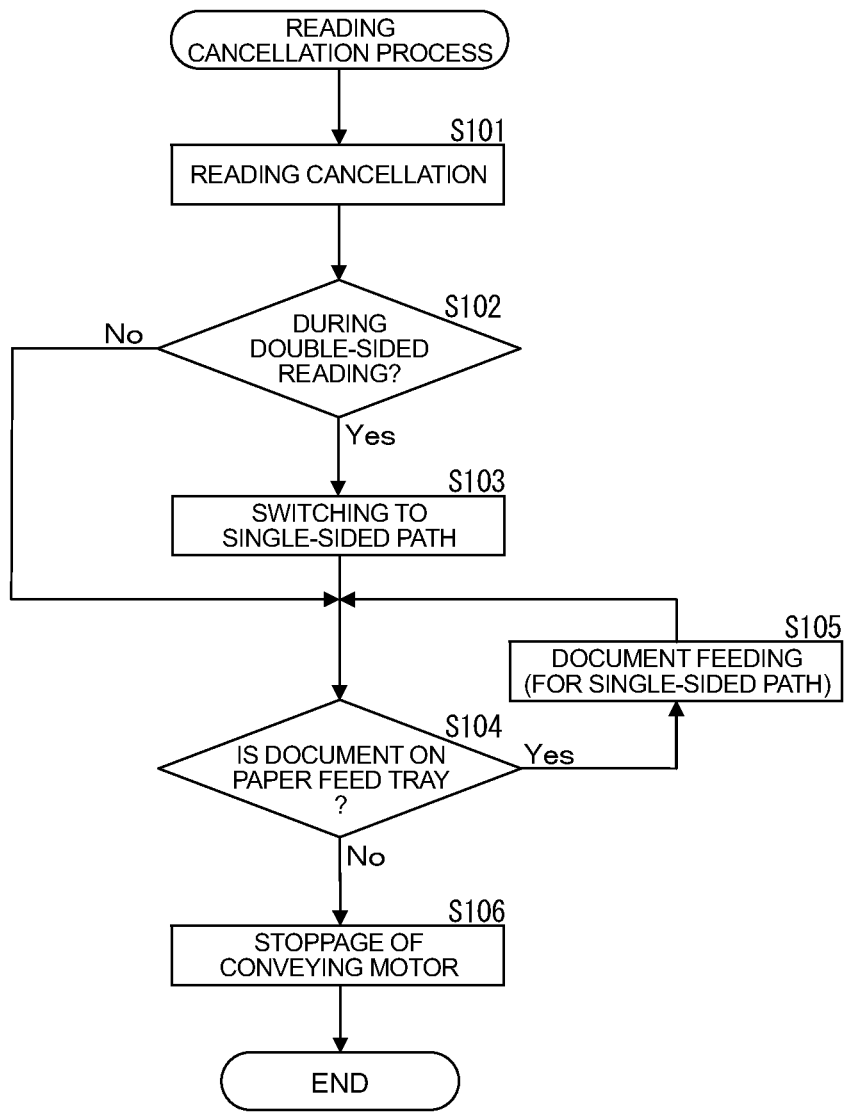
FIG. 9 is a flowchart illustrating one example of a reading cancellation process according to the first preferred embodiment of the present invention.

Steps S101 to S106 in FIG. 9 represent a flowchart illustrating a non-limiting example of a reading cancellation process according to the first preferred embodiment of the present invention. The reading cancellation process is started when the instruction to cancel document reading is inputted. That is, when a user operates the stop key 212, or the cancel instruction signal is inputted from a user terminal, the reading cancellation process is started.

First, on the basis of a cancel instruction, document reading by the scanner unit 22 is cancelled (Step S101). At this time, without stopping the conveying motor 36, the conveyance control device 32 continues the rotational drive. For this reason, a document on any of the conveyance paths B1 to B5 is conveyed to the discharge port 18 without being read at the reading position C2, and then discharged to the paper discharge tray 12.

If the above reading cancellation corresponds to the cancellation of double-sided reading, the path switching device 17 switches a conveyance route from the double-sided path to the single sided path (Steps S102 and S103). When the cancel instruction is outputted from the operation input device 21*a*, the conveyance control device 32 immediately outputs a path specifying signal that specifies the single-sided path. For this reason, when the cancel instruction is inputted during the double-sided reading, the conveyance route is switched from the double-sided path to the single-sided path.

On the basis of the conveyance route switching, a document that is present on the conveyance path B1 at the time of the reading cancellation, that is, a document of which feeding was started immediately before the input of the cancel instruction and a fore end thereof has not arrived at the branch point C1 at the time of the input of the cancel instruction is guided to the single-sided path. Accordingly, as compared with a conventional image reader that guides such a document to the double-sided path in the same manner as that before the reading cancellation, the time necessary for the discharge process can be shortened.

Next, if any document is left on the paper feed tray 11, document feeding for the idle feeding process is performed (Steps S104 and S105). While determining the presence or absence of a document on the paper feed tray 11 on the basis of a detection result by the document detecting sensor DS1, the conveyance control device 32 repeatedly outputs the feeding signal to the document feeding device 15 until no document is left. At this time, the feeding signal is outputted at timing at which a document interval becomes equal to the interval for single-sided reading. That is, in the idle feeding process, documents are sequentially fed such that the document interval becomes narrower than that for double-sided reading. Accordingly, even if the double-sided reading is cancelled, in the subsequent idle feeding process, as with the single-sided reading, documents are fed at narrower document intervals, and the documents are guided to the single-sided path to be thereby able to shorten the time necessary for the idle feeding process.

Then, when all documents on the paper feed tray 11 are discharged to the paper discharge tray 12, the conveyance control device 32 stops the conveying motor 36 to terminate the reading cancellation process (Step S106).

Second Preferred Embodiment

In the first preferred embodiment, an example of the case of, when double-sided reading is cancelled, immediately switching a conveyance route is described. On the other hand, in the present preferred embodiment, an operational example of preventing documents from being brought into contact with each other by switching a conveyance route is described.

Figure 10:
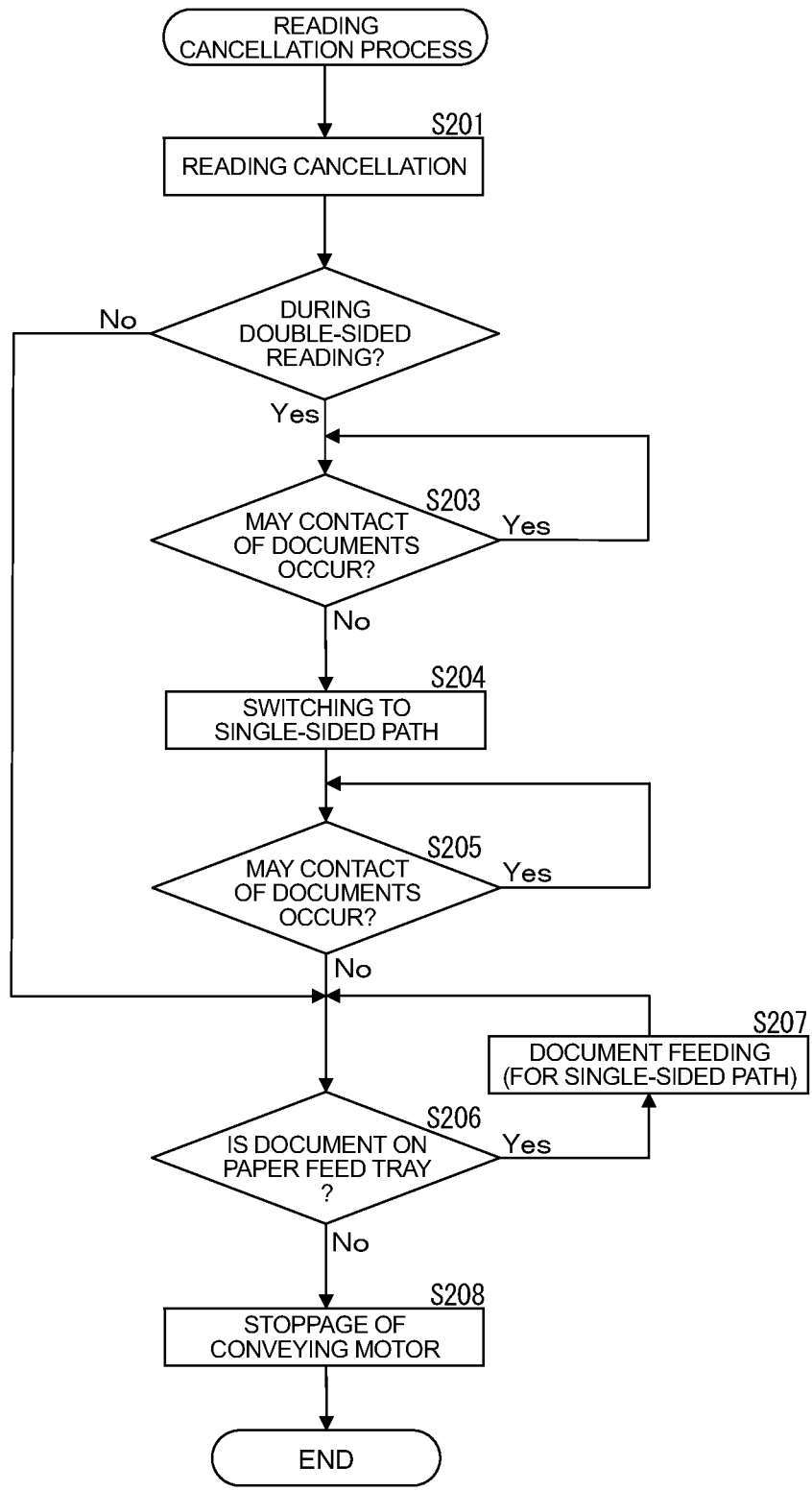
FIG. 10 is a flowchart illustrating one example of a reading cancellation process according to a second preferred embodiment of the present invention.

Steps S201 to S208 in FIG. 10 represent a flowchart illustrating one example of a reading cancellation process according to the second preferred embodiment of the present invention. This reading cancellation process is the same as Steps S101 to S106 in FIG. 9 except for Steps S203 and S205, and therefore redundant description is omitted.

In Step S203, in the case where, when a conveyance route is immediately switched at the time of canceling double-sided reading, contact of documents with each other occurs, switching timing of the conveyance route is delayed to prevent the contact of the documents with each other. The conveyance control device 32 determines whether or not the contact of the documents with each other occurs at the junction point C3 by switching the conveyance route, and if the contact is likely to occur, delays the switching timing of the conveyance route.

In the case where the canceled double-sided reading is based on the alternate or batch system, if the conveyance route is immediately switched to guide a document on the conveyance path B1 to the single-sided path, at the junction point C3, the document may be brought into contact with a preceding document. For this reason, the path specifying signal outputted from the conveyance control device 32 to the path switching device 17 is delayed to prevent the documents from being brought into contact with each other during the discharge process. That is, in the case of canceling the double-sided reading based on the alternate or batch system, the single-sided path is not used in the subsequent discharge process.

For example, the conveyance control device 32 is configured to, on the basis of a detection result by the document detecting sensor DS3 or DS4, determines that a document on the conveyance path B1 has passed through the branch point C1, and then output the path specifying signal. Alternatively, the conveyance control device 32 may be configured to provide a delay by a constant time enough for a document fed immediately before reading cancellation to pass through the branch point C1, and then output the path specifying signal. In addition, in the case where a document that is passing through the branch point C1 at the time of switching the conveyance route is conveyed to the conveyance path before switching of the conveyance route through a state of being brought into contact with the rotating member 17*a*, the above-described pass through the branch point C1 may be determined based on a fore end of the document.

On the other hand, in the case where the cancelled double-sided reading is based on the sequential system, on the basis of the cancel instruction, the conveyance route is immediately switched. In the sequential system, a document interval is sufficiently wide, and therefore even in the case of immediately switching the conveyance route at the time of reading cancellation, it is not possible that documents are brought into contact with each other at the junction point C3 as in the alternate or batch system case.

In Step S205, in order to prevent documents fed before and after the reading cancellation from being brought into contact with each other at the junction point C3, feeding timing of the first document in the idle feeding process is adjusted. In the case of performing the idle feeding process after the double-sided reading cancellation, the first document passing through the single-sided path in the idle feeding process may catch up with a last document passing through the double-sided path in the discharge process to thereby bring the both documents into contact with each other at the junction point C3.

In order to prevent such contact of documents with each other, at the start of the idle feeding process, the conveyance control device 32 adjusts a timing to output the feeding signal to the document feeding device 15. That is, at the time of reading cancellation, document feeding is once canceled such that after a rear end of a document that was fed last before the input of the cancel instruction has passed through the junction point C3, a document that is fed first after the cancellation process passes through the junction point C3, and then the document feeding is restarted. Such adjustment of the start timing of the idle feeding process is performed not only in the case of the alternate or batch system but also in the case of the sequential system.

For example, the conveyance control device 32 is configured to, on the basis of a detection result by the document detecting sensor DS4 or DS5, determine a conveyance position of a last document fed before the input of the cancel instruction; output the feeding signal at a timing that prevents a first document in the idle feeding process from being brought into contact with the above-described document that is being discharged; and start to feed the first document in the idle feeding process. Alternately, the conveyance control device 32 may be configured to provide a delay by a constant time enough to prevent documents fed before and after the reading cancellation from being brought into contact with each other at the junction point C3, and output a first feeding signal in the idle feeding process. In addition, a preferred embodiment of the present invention may be configured to selectively cancel feeding at the time of reading cancellation only in the case of the alternate or batch system, but not to cancel the document feeding in the case of the sequential system.

Also, in the case where if the conveyance route is immediately switched at the time of double-sided reading cancellation, it is determined that contact of documents with each other occurs, a preferred embodiment of the present invention may be configured to adjust start timing of the idle feeding process. That is, if it is necessary to delay the switching of the document conveyance route, a document that was fed last before the input of the cancel instruction and a subsequent document are likely to be brought into contact with each other. For this reason, it is preferable to cancel document feeding, and start conveyance to the single-sided path from a document after a restart of the feeding. In this case, between the document after the restart of the feeding and the preceding document, a document interval that is longer than an original document interval occurs to be thereby able to prevent the documents from being brought into contact with each other by switching the conveyance route.

Note that, in the above preferred embodiment, an example of a configuration is described, where, at the time of double-sided reading, first and second surfaces of a document are sequentially read; however, the present invention is not limited to such a case. That is, the present invention can also be applied to an image reader that, at the time of double-sided reading, sequentially reads second and first surfaces. Single-sided reading in such an image reader may read a second surface or a first surface.

Also, in the present preferred embodiment, in the idle feeding process, a configuration where documents are conveyed at the document interval for single-sided reading is described; however, the present invention is not limited to such a case. That is, a document interval in the idle feeding process is only required to be narrower than a document interval for double-sided reading, and does not necessarily coincide with the document interval for single-sided reading.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An image reader comprising:
    a reading specifying device arranged to specify either of double-sided reading and single-sided reading as a document reading method;
    a document feeding device arranged to feed a document from a paper feed tray;
    a route switching device arranged to, at a branch point between a first conveyance path for the double-sided reading and a second conveyance path for the single-sided reading, on a basis of the specified reading method, switch a document conveyance route; and
    a cancel input device arranged to input a cancel instruction for the double-sided reading; wherein
    the route switching device selects the second conveyance path on a basis of the cancel instruction;
    the first conveyance path is longer than the second conveyance path;
    one or more documents that are left on the paper feed tray when the cancel instruction is inputted are fed after the input of the cancel instruction, and discharged through the second conveyance path; and
    if two or more documents are left on the paper feed tray when the cancel instruction is inputted, the document feeding device feeds the two or more documents at document intervals that are narrower than a document interval for the double-sided reading before the input of the cancel instruction.

2. The image reader according to claim 1, wherein the first conveyance path includes:
    an introduction path that conveys a document from the branch point to a reading position, and
    a U-turn path that causes the document having entered from the introduction path and passed through the reading position to make a U-turn and again enter the reading position; and
    the second conveyance path joins the first conveyance path at a junction point in the U-turn path without passing through the reading position.

3. The image reader according to claim 2, further comprising a paper feed path that conveys a document from the paper feed tray to the branch point, wherein
    a document that is being conveyed through the paper feed path when the cancel instruction is inputted is discharged through the second conveyance path.

4. The image reader according to claim 2, wherein the document feeding device once cancels document feeding after the input of the cancel instruction and then restarts the document feeding such that a fore end of a document that is fed first after the input of the cancel instruction arrives at the junction point after a rear end of a document that was fed last before the input of the cancel instruction has passed through the junction point.

5. The image reader according to claim 1, further comprising a document placement detector arranged to detect a document on the paper feed tray, wherein all documents that are left on the paper feed tray when the cancel instruction is inputted are discharged through the second conveyance path.

6. The image reader according to claim 4, further comprising a document contact determination device arranged to, if the route switching device selects the second conveyance path on a basis of the cancel instruction, determines whether or not contact of documents with each other occurs; wherein
    the route switching device selects the second conveyance path on a basis of a result of a determination by the document contact determination device after a document that was fed last before the input of the cancel instruction has arrived at the branch point; and
    the document feeding device once cancels the document feeding on a basis of the result of the determination by the document contact determination device after the input of the cancel instruction, and then restarts the document feeding.

7. The image reader according to claim 6, wherein the document contact determination device determines on a basis of a document interval on the first conveyance path whether or not the contact of the documents with each other occurs.

8. The image reader according to claim 6, further comprising:
 a paper feed path that conveys a document from the paper feed tray to the branch point; and
 a reading system specifying device arranged to be able to specify, as a reading system for the double-sided reading, a sequential system that does not simultaneously convey two or more documents on the U-turn path; wherein
 if the cancel instruction is inputted during double-sided reading based on the sequential system, a document that is being conveyed through the paper feed path when the cancel instruction is inputted is discharged through the second conveyance path, and the document feeding device does not once cancel the document feeding.

9. The image reader according to claim 6, further comprising a reading system specifying device arranged to be able to specify, as a reading system for the double-sided reading, an alternate system that makes different documents enter the reading position alternately from the introduction path and the U-turn path; wherein
 if the cancel instruction is inputted during double-sided reading based on the alternate system, the route switching device selects the second conveyance path after a fore end of a document that was fed last before the input of the cancel instruction has arrived at the branch point, and the document feeding device once cancels the document feeding after the input of the cancel instruction, and then restarts the document feeding.

10. The image reader according to claim 6, further comprising a reading system specifying device arranged to be able to specify, as a reading system for the double-sided reading, a batch system that makes two or more documents continuously enter the reading position from one of the introduction path and the U-turn path; wherein
 if the cancel instruction is inputted during double-sided reading based on the batch system, the route switching device selects the second conveyance path after a fore end of a document that was fed last before the input of the cancel instruction has arrived at the branch point, and the document feeding device once cancels the document feeding after the input of the cancel instruction, and then restarts the document feeding.

11. The image reader according to claim 2, wherein the document feeding device feeds documents at narrower document intervals during the single-sided reading than the document interval for the double-sided reading, and if two or more documents are left on the paper feed tray when the cancel instruction for the double-sided reading is inputted, the document feeding device feeds the documents at the same document intervals as the document interval for the single-sided reading.

12. A document conveying method comprising:
 a reading specifying step of specifying either of double-sided reading and single-sided reading as a document reading method;
 a document feeding step of feeding a document from a paper feed tray;
 a cancel input step of inputting a cancel instruction for the double-sided reading; and
 a route switching step of, at a branch point between a first conveyance path for the double-sided reading and a second conveyance path for the single-sided reading, the second conveyance path being shorter than the first conveyance path, on a basis of the specified reading method, switching a document conveyance route, and on a basis of the cancel instruction, selecting the second conveyance path; wherein
 one or more documents that are left on the paper feed tray when the cancel instruction is inputted are fed after the input of the cancel instruction, and discharged through the second conveyance path; and
 if two or more documents are left on the paper feed tray when the cancel instruction is inputted, in the document feeding step, the two or documents are fed at document intervals that are narrower than a document interval for the double-sided reading before the input of the cancel instruction.

13. The document conveying method according to claim 12, wherein the first conveyance path includes:
 an introduction path that conveys a document from the branch point to a reading position; and
 a U-turn path that causes the document having entered from the introduction path and passed through the reading position to make a U-turn and again enter the reading position; and
 the second conveyance path joins the first conveyance path at a junction point in the U-turn path without passing through the reading position.

14. The document conveying method according to claim 13, further comprising a paper feed step of conveying a document from the paper feed tray to the branch point, wherein a document that is being conveyed by the paper feed step when the cancel instruction is inputted is discharged through the second conveyance path.

15. The document conveying method according to claim 13, wherein in the document feeding step, document feeding is once cancelled after the input of the cancel instruction and then restarted such that a fore end of a document that is fed first after the input of the cancel instruction arrives at the junction point after a rear end of a document that was fed last before the input of the cancel instruction has passed through the junction point.

* * * * *